Nov. 20, 1962  J. C. COOLIDGE ET AL  3,064,702

WHEEL

Filed July 11, 1960

INVENTORS
WALTER A. HARTZ
JAMES C. COOLIDGE
BY
ATTORNEY

United States Patent Office 3,064,702
Patented Nov. 20, 1962

3,064,702
WHEEL
James C. Coolidge, Akron, and Walter A. Hartz, Cuyahoga Falls, Ohio, assignors to The General Tire & Rubber Company, a corporation of Ohio
Filed July 11, 1960, Ser. No. 41,885
3 Claims. (Cl. 152—212)

The present invention relates, generally, to wheels; and more particularly, it is a novel wheel construction adapted to be utilized in connection with aircraft.

Conventionally, wheels for aircraft have been formed of a metallic rim to which is fitted a solid rubber or an air-inflated rubber tire. These wheels, utilizing various and sundry tire constructions, are incorporated in a landing gear which usually includes a hydraulic or mechanical spring to absorb the major shock encountered during the landing of the aircraft.

The organic nature of the rubber or elastomeric tire has long been recognized as a limiting factor on the life expectancy of the wheel. However, the resilience, the flexibility, and the other properties of these materials have been desirable in absorbing the first initial shock upon first contact with the ground.

With the development of improved power sources to increase the speed, range and altitude of aircraft thereby making necessary high-speed landings, the limitations of the rubber tire wheels have become more critical, and it is not uncommon for aircraft tires to be capable of only one landing. Even more important is the deterioration and/or degradation temperature of the rubbers and elastomers. Thus, it is known that tires fabricated of rubber cannot undergo exposure to temperatures much above 300° F. Accordingly, aircraft which must travel at speeds which cause the temperatures of exposed surfaces to exceed this temperature could be left with no tires. Likewise, aircraft which are exposed to temperature and pressure conditions beyond or proximate the earth's atmospheric limits also encounter a wide range of temperature and pressure changes which could lead to tire destruction. More important, aircraft which have been flown to extremely high altitudes encounter tremendous heat build-up when the aircraft leaves the rarified atmosphere and re-enters the denser atmosphere of the earth. In this latter situation, temperatures in the neighborhood of 1500° F. to 3000° F. can be expected, and it is suspected that even higher temperatures might be encountered. It will be readily appreciated that under all of the foregoing conditions a conventional tire would practically disintegrate and the craft would be left without any cushioning for the landing of the craft.

Accordingly, it is a principal object of the present invention to provide an entirely new concept in the design and construction of an aircraft landing gear.

It is also an object of the present invention to provide an aircraft landing gear wheel which is capable of exposure to high temperature conditions without suffering destructive deterioration and/or degradation, thus permitting safe landing of the craft employing same even though the aircraft has been exposed to elevated temperatures.

It is still another object of the present invention to provide an aircraft landing wheel which is so constructed that it includes an arrangement for efficient, practical dissipation of heat build-up therein.

It is yet another object of the present invention to provide such an aircraft wheel which closely simulates the landing characteristics of a conventional aircraft wheel employing a rubber or elastomeric tire.

The foregoing and other objects of the present invention will become apparent to those skilled in the art from the following detailed description taken in conjunction with the annexed sheets of drawings on which there is presented, for purposes of illustration only, several embodiments of the present invention.

In its simplest embodiment, the present invention contemplates an aircraft landing wheel construction in which the ground-contacting surface is composed of a great plurality of filaments disposed in radially extending relationship from said structure and terminating so as to define the periphery of a circle.

Figure 1:
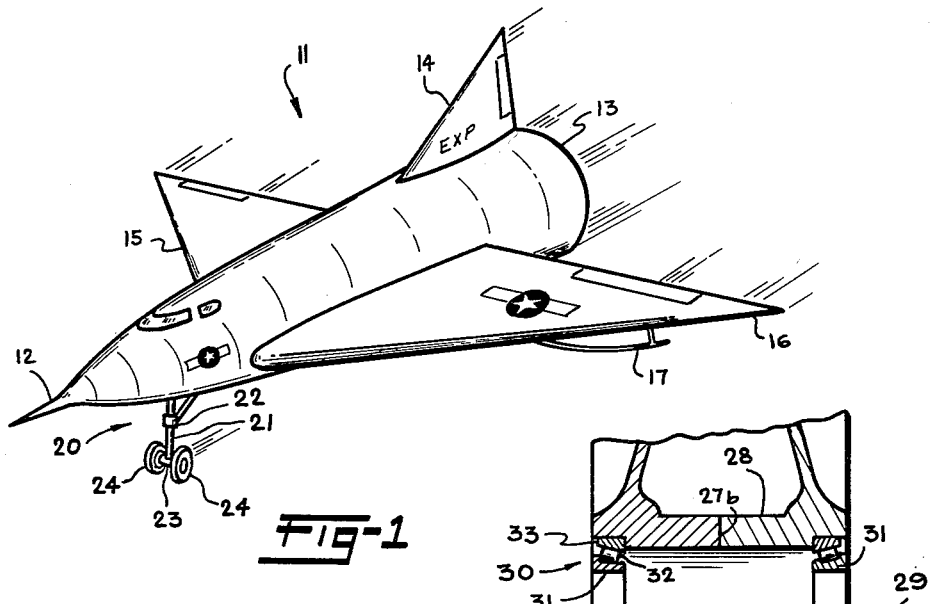
FIG. 1 is a perspective view of a more-or-less imaginary aircraft from which depends a nose landing gear in which is embodied the present invention.

Referring now more specifically to the drawings, there is shown in FIG. 1 an aircraft 11 having a nose section 12, a tail section 13, a vertical stabilizer section 14, and laterally extending wings 15 and 16. Depending from the wings are skid or runner members, only one of which is shown and identified by the numeral 17. A landing gear assembly 20 depends from the nose portion of the aircraft and such is steerable by the pilot in order to provide some control of direction of the craft after landing on the ground. The landing gear includes a main vertical shaft 21 including a shock-absorbing unit 22. The shaft connects with a horizontal axle 23 on each end of which is mounted in rotatable relationship, a wheel 24 constructed in accordance with the present invention.

Figure 2:
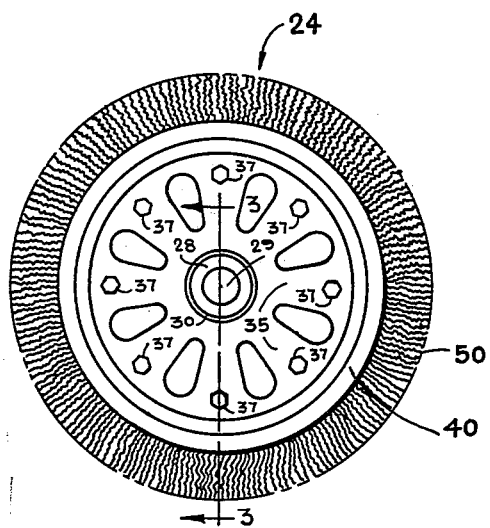
FIG. 2 is a side elevation view of the landing wheel of the present invention.
Figure 3:
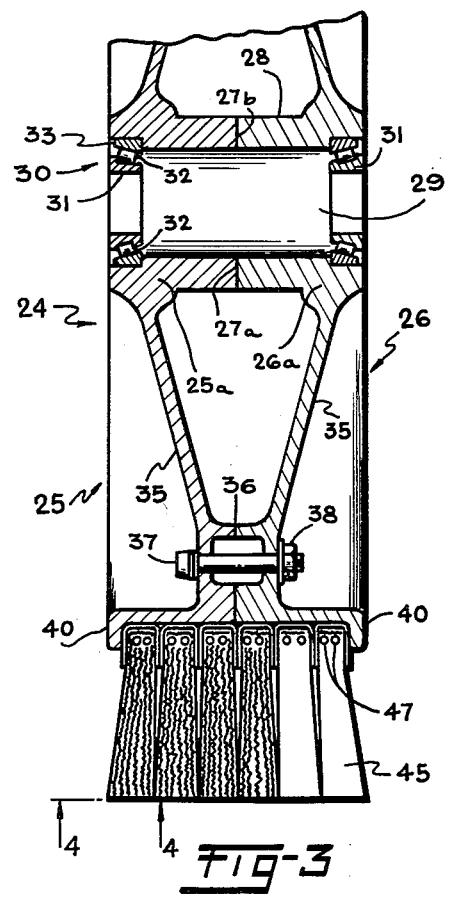
FIG. 3 is a sectional view on an enlarged scale taken on the line 3—3 of FIG. 2.
Figure 4:
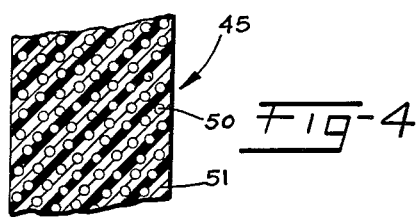
FIG. 4 is a sectional view, greatly enlarged, taken on the line 4—4 of FIG. 3 and illustrating a particular embodiment of the present invention.

The wheel 24 is shown in greater detail in FIGS. 2, 3 and 4 from which it can be seen that it is composed of a pair of annular members 25 and 26 each having a central hub portion 25a and 26a respectively. The inner-facing surfaces 27a and 27b of the hubs are located in abutment with each other. The thus defined hub 28 includes an axial bore 29 which serves as a passageway for the axle 23. The hub includes a bearing assembly 30 at each end of the passageway 29. The bearing includes inner race members 31 which are swage fitted to the axle, cylindrical bearings 32 which revolve about the race 31 and corresponding race 33 formed in the hub. This provides rotatability of the wheel. Each wheel half member 25 and 26 includes radially extending spokes 35 which proceed in converging relationship (as seen in FIG. 3) to a point of tangency as at 36 where bolts 37 and nuts 38 may be used to secure the two halves together as shown. The periphery of each half wheel is provided with a flange 40 which, in assembled figuration defines a channel opened in the outward direction.

The distance between the flanges 40 can be adjusted by the nut and bolt assembly and thus is adapted to hold a plurality of elements 45 which constitute the principal element of the wheel of the present invention. The elements 45 are themselves annular members of U-shaped, cross-sectional configuration with the open end facing outwardly and into which is introduced a large number of identical lengths of metallic wire. The lengths of wire are bent at their midpoint much like a hairpin and the loop formed at the midpoint is secured in the channels 48 by means of lengths of wire 47 which encircle the elements 45 within the confines of the channel 48. The individual doubled-over wires are cinched tightly in the elements 45 by the channels 48; and, as can be seen in FIG. 3, six of such sub-assemblies are located between the flanges 40 of the half members 25 and 26 and tightened securely by the bolts and nuts 37 and 38 to 38 to hold the elements 45 in fixed relationship with the wheel proper.

In accordance with a preferred embodiment of the present invention as best shown in FIG. 4, the elements 45 include, in addition to the radially extending wires or filaments 50, a matrix 51 which surrounds each one of the wire filaments. The matrix serves to support or reinforce the radially extending wire filaments. It thus contributes to what may be called the column strength and prevents or materially reduces the tendency for the filaments to become bent or deflected under load conditions. Wheels constructed in accordance with the invention but not including the matrix have been tested on a dynamometer under a loading corresponding to the weight of an aircraft and were found, after loading, to have become somewhat frayed or bowed outwardly. However, a wheel identical to that just described, but in which a matrix had been included, was found to be capable of withstanding increased loads without detrimental fraying. In addition, the utilization of a matrix or encapsulating material increased the temeprature limits which could be endured.

The matrix compositions, considered broadly, may be any material which can be conveniently introduced into the spaces or voids between the individual wires or filaments and which is capable of providing reinforcement or increased column strength and preferably under the temperature conditions which might be encountered under severe service conditions. Ideally, the material should possess some inherent resilience or elasticity at the environmental conditions so that if the surface of the wheel, which contacts the ground wears away, it will permit some slight deflection of the end portions of the filaments. It will be appreciated that if the matrix is completely rigid as, for instance, by using a cement or plaster, the wheel could not deflect at all and the wheel would have no cushioning character. We have found that fibere-filled synthetic resinous materials possess the ability to satisfy the requirements outlined. The temperature likely to be involved favors the utilization of inorganic, fibrous fillers such as asbestos or Fiberglas and the like. The resinous component may be any synthetic resin capable of enduring short exposures to temperatures ranging from a —65° F. to about 5000° F. for an extended period of time. A resin which we have found to be particularly desirable as a matrix composition is a high heat-resistant laminating phenolic resin marketed by the Reichhold Chemicals, Inc., under the trademark Plyophen 5900. This resin is a liquid resin to which we add 50% by weight of a fibrous form of an asbestos to form a preferred matrix composition. Preferably the asbestos should be one which is iron free. The physical mixture of the fibrous form of asbestos and the liquid phenolic resin forms a paste or gunk-like composition which is conveniently introduced into the spaces or voids between the individual filaments by use of a pressure gun, e.g., a calking compound gun. Another high heat resistant phenol-formaldehyde laminating resin is manufactured and sold by Monsanto Chemical Company under the trademark Resinox SC–1008. Still another high temperature phenolic resin is marketed by NARMCO under the trademark Conolon–506. These heat resistant or high temperature phenolic resins are prepared by reacting one mol of phenol with up to 2.5 mols of formaldehyde. Preferably the high temperature phenolics include a volatile basic catalyst such as ammonium hydroxide which is removed during the cross-linking of the condensation product. In this respect these high temperature phenolic resins develop differently from the non-heat resistant phenolics in that the latter generally utilize acid catalysts. These high temperature phenolic resins also find application as laminating resins for Fiberglas in forming structural parts. The resins referred to have been approved as meeting military specifications identified as MIL–R–9299 (USAF).

It will be appreciated, however, that other synthetic resins, gums, elastomers and rubbers and the like having similar properties, particularly high temperature properties, may be used to manufacture the wheels of the present invention.

Wheels as described above have been built having 12 inch diameters and effective tread widths of about 5 inches. The wheels were exposed to a series of static and dynamic tests which revealed the practical feasibility of the wheel for aircraft use. The wheel fairly closely simulated and provided the cushioning effect of a conventional inflatable rubber tire. To simulate the severity of the temperature expected, an oxyacetylene torch was played directly over the periphery of ground-contacting surface until the exposed ends of the filaments were red-hot. Even at this temperature the wheel did not fail when impact loaded. The static and dynamic tests have revealed that the gauge of the wire is related to the load and deflection properties which can be expected of the wheel. We have found that the optimum performance, having in mind the total loading and the deflection desired to give it cushioning, is obtained when the wire or filament diameter is about 0.010 to 0.015 inch.

Wheels constructed in accordance with the foregoing description possess many advantages over conventional wheel and tire assemblies. Thus the wheel is capable of absorbing much more heat than a conventional wheel and tire assembly without destruction thereof. In addition, when a peak temperature is reached due to the conditions endured, the wheel is capable of dissipating the absorbed heat much more rapidly than the conventional wheel and tire assembly. It will, of course, be appreciated that if the craft bearing the wheel assembly of the invention re-enters a denser atmosphere from a more rarified atmosphere, the heat build-up in the wheel will be tremendous. While it is not completely understood, it is believed that the heat dissipation feature of the wheel assemblies of the invention is accomplished in part by an ablation of the matrix composition. By ablation we mean a conversion of a portion of the resinous material into a gaseous film which due to the thermodynamic character of the gas permits the accomplishment of the improved heat properties of the assembly.

A conventional tire construction employing a rubber or elastomer fabricated tire forms, in effect, an insulator or heat barrier which retains the heat in the interior of the wheel rather than dissipating same as is possible with the wheel in accordance with this invention.

Wheels of the invention are capable of enduring a wide range of temperature and pressure variations. It will be further appreciated that wheels in accordance with our invention are advantageous over conventional wheel tire assemblies inasmuch as no inflation or maintenance of air pressure is necessary which would be a problem under the conditions to which the wheel is to be exposed.

The construction in accordance with this invention also provides a wide latitude in designing wheels of varying load-carrying capabilities. Thus, the composition of the metal and the diameter of the wire filaments can be easily varied to give a desired load deflection character in accordance with the weight and the expected landing parameters. In addition, of course, the formulation of the matrix or encapsulating material may be tailored to give the desired characteristics under the temperature-pressure conditions encountered.

While we have disclosed certain preferred embodiments and details of the construction in describing our invention in accordance with the patent statutes, it is not intended that the scope of our invention be limited thereto except as defined in the appended claims.

We claim:

1. A landing gear for non-terrestial craft which comprises a framework member depending from and secured to said craft and a wheel member rotatably mounted on said framework, said wheel member being composed of a periphery formed of a plurality of wire-like filaments of a heat-conductive material disposed in radial relationship with respect to said wheel, said filaments being individually flexible and being collectively sufficiently stiff to provide firm cushioning landing characteristics for the said craft, all of said filaments being completely surrounded, except for the terminal ends, in a high temperature resistant matrix capable of enduring temperatures in excess of 1500° F.

2. The landing gear of claim 1 wherein the matrix is a filled phenolic resin.

3. The landing gear of claim 2 wherein the phenolic resin is a phenol formaldehyde resin condensation product crosslinked in the presence of a volatile basic catalyst.

References Cited in the file of this patent

UNITED STATES PATENTS

| | | |
|---|---|---|
| 942,682 | Vacher | Dec. 7, 1909 |
| 990,350 | DeFerranti | Apr. 25, 1911 |
| 1,217,619 | Molin | Feb. 27, 1917 |
| 1,834,427 | Schumacher | Dec. 1, 1931 |
| 2,301,809 | Ovalle | Nov. 10, 1942 |
| 2,611,759 | Hempel | Sept. 23, 1952 |
| 2,648,084 | Swart | Aug. 11, 1953 |